United States Patent Office 2,775,540
Patented Dec. 25, 1956

2,775,540

PRODUCTION OF DEXTRAN

Ernest L. Wimmer, Springfield, and George D. Lakata, Philadelphia, Pa., assignors to The American Sugar Refining Company, New York, N. Y., a corporation of New Jersey No Drawing. Application December 18, 1950, Serial No. 201,498

4 Claims. (Cl. 195—31)

This invention relates to the microbiological production of gum dextran and more particularly to an improved and economical fermentation process for producing it.

Many types of microorganisms are known that are capable of synthesizing polysaccharides when cultivated on a simple carbohydrate substrate. The polysaccharide, gum dextran, is readily produced from sucrose by several species of the genus Leuconostoc, i. e., strains of *L. mesenteroides* and *L. dextranicum*. Glucose, fructose and invert sugar are not converted to dextran by these organisms.

In the production of dextran from sucrose by fermentation with Leuconostoc a sterile sucrose solution has been used containing inorganic salt nutrients and fortified with essential amino acids and vitamins.

The present invention provides an improved fermentation process in which the required growth factors for the dextran fermentation are first produced by fermenting a dilute sugar-bearing solution with yeast to form a whole yeast beer, to which, after sterilization, sucrose and the Leuconostoc culture are added for the dextran fermentation.

It is one of the objects of this invention to provide a rapid fermentation process for the production of dextran in good yield which does not require the addition of expensive protein or vitamin nutrients to the medium.

A further object of this invention is to provide a fermentation process for the production of dextran which requires no organic raw materials other than sugar and sugar-bearing liquors normally obtainable in sucrose refining operations.

The improved process of the present invention is a two-step process, in the first of which a dilute sugar-bearing solution is fermented with yeast to produce a whole yeast beer which is used in the second or dextran fermentation step of the process. The whole yeast beer from the first step is fortified with sucrose or a sucrose-bearing material and required inorganic nutrients, sterilized and inoculated with a suitable strain of the Leuconostoc organism for the second or dextran fermentation step of the process.

We have found that when yeast is cultivated in a dilute sugar-bearing solution, growth factors are synthesized which the Leuconostoc organism requires for the production of dextran from sucrose.

Several strains of yeast are satisfactory for producing the required nutrient. Strains of *Saccharomyces cerevisiae* or *Torula utilis* are preferred because of the relative ease of cultivation and rapid elaboration of growth factors.

The sugar-bearing solutions used for cultivating the yeast may be a sugar-solution made from cane juice, raw sugar, refined sugar, glucose, blackstrap or beet molasses, hydrol, and enzymatic or acid hydrolyzates of starchy or cellulose materials. It is advantageous to use a crude cane sugar liquor because of the presence of a natural stimulant for the subsequent production of dextran.

The yeast medium is prepared to contain 0.5–15% fermentable sugar and the required amount of nitrogen and phosphate salts. The nutrients required will vary with the purity of the sugar substrate. Nitrogen is advantageously supplied as ammonium sulfate, chloride, nitrate or phosphate, urea or ammonia and phosphate as phosphoric acid, or as a soluble phosphate salt. The nutrient medium is adjusted to pH 4–6 and sterilized. The selected strain of yeast is added and the culture is vigorously aerated at a temperature of 20–35° C. until a maximum production of yeast cells is obtained, e. g., 10 to 24 hours.

When the yeast has been thus cultivated to give a favorable yield of yeast cells, the yeast fermentation beer is then pasteurized to destroy invertase activity and kill the yeast cells. Heating at 75° C. to 100° C. for from 5 to 30 minutes is sufficient. The heating or pasteurizing of the yeast fermentation beer breaks up and kills the yeast cells, releasing the soluble constituents of the yeast cells, and leaving the insoluble residue in a finely divided state. By subjecting the pasteurized medium to filtering or centrifuging the yeast cells and any other suspended material can be removed, leaving a liquid fermentation beer for use in the subsequent dextran fermentation. When the medium is not filtered or centrifuged the finely divided yeast cell residues remain in the beer during the subsequent dextran fermentation.

The medium for the Leuconostoc fermentation is then prepared. Sucrose is utilized as the substrate and it is furnished by cane juice, high-test molasses, raw sugar, refined sugar or some liquor of intermediate purity which may be obtained in normal cane or beet sugar refinery processes. Blackstrap and beet molasses may also be used but the dextran product is more difficult to purify and the invert sugars present are not converted to dextran during the fermentation. It is advantageous to use a crude cane sugar product because of the presence of factors stimulatory to dextran production.

The sucrose source is added directly to the pasteurized yeast fermentation beer to produce the Leuconostoc medium. Favorable concentration of sucrose is 5–35%. Further additions of inorganic nutrients may be made. The pH is adjusted to 5.5 to 7.5 with alkali and the medium is sterilized. Inoculation is made with an actively growing selected strain of *Leuconostoc mesenteroides* or *L. dextranicum* and incubation is conducted at 15–30° C. The inoculum is 2–10% by volume. Maximum dextran production is obtained in 24–36 hours.

The amount of yeast beer required in the dextran fermentation is a function of the purity and amount of sugar used as the substrate for the Leuconostoc and, in general, a definite minimum amount of yeast beer should be added to the fermentation to obtain a maximum yield of dextran. Thus, in carrying out the fermentation by the addition of 10% refined sugar to the filtered yeast beer to form the substrate, it was found that yeast beer corresponding to a yeast count of $6 \times 10^5$ cells per milliliter was required to produce optimum yield of dextran; while a comparable dextran yield was obtained when the substrate was made by adding 10% raw sugar to filtered yeast beer corresponding to a yeast count of but $2 \times 10^5$ cells per milliliter.

The above fermentation procedure has many definite advantages. The utilization of yeast beer in the fermentation has the advantage that it contains all the organic growth factors necessary to the production of dextran in a particularly advantageous manner. Thus, when the yeast beer is utilized in the growth medium, both endo-cellular and exocellular products of yeast growth are available. Furthermore, the yeast is obtained at maximum freshness and nutritive value. Therefore, a minimum amount of yeast or yeast products are required. A minumum of processing equipment is required; the yeast and dextran fermentations may be conducted in the same fermenter. The cost of the required growth factors for the dextran fermentation is at a minumum because it is supplied by the amount of crude sugar solution and inorganic salts to produce the requisite yeast beer. It is also more advantageous than growing yeast and Leuconostoc symbiotically inasmuch as the amount of sugar consumed and inverted by the yeast is carefully controlled.

It is also an advantage of the process that the yield of dextran approaches the theoretical available amount (47.3%). Approximately 42 to 46% of the sucrose added is converted to dextran.

The invention will be further illustrated by the following specific examples but it will be understood that the invention is not limited thereto.

*Example 1.*—The following ingredients are mixed together and sterilized by heating at 250° F. for 10 minutes:

| | Parts |
|---|---|
| Raw sugar | 10.0 |
| $KH_2PO_4$ | 5.0 |
| $MgSO_4.7H_2O$ | 0.2 |
| NaCl | 1.0 |
| $(NH_4)_2SO_4$ | 0.6 |
| Water to | 1000 | pH adjusted to 4.8 with $H_2SO_4$

After cooling to 28° C. an active culture of *S. cerevisiae* growing in a similar medium is added. The inoculum is 3% of the volume of the fermenter medium. Air is blown through at a rate equivalent to 0.5 vol. air per vol. fermenter per min. After 10 hours the medium is free of sugar and contains $6 \times 10^5$ yeast cells/ml. It is pasteurized by heating to 80° C. for 30 minutes and then filtered. Granulated, refined sucrose (100 parts) is added to the filtrate and the pH is adjusted to 7.0 with NaOH.

The resultant fermentation medium is sterilized at 125° C. for 10 minutes. After cooling to 25° C. it is inoculated with an active 12 hour culture of *L. mesenteroides* which is growing in an identical medium. The inoculation is 5% by volume. The fermentation medium becomes opalescent after several hours and a rapid increase in viscosity is observed which reaches a maximum in about 32 hours. Analyses of the smooth, viscid fermented medium so produced have indicated the presence of 42.7 parts of dextran, 48.4 parts reducing sugar calculated at fructose and only 9.5 parts of residual sucrose.

*Example 2.*—50° Brix Cuban molasses is adjusted to pH 4.5 and sterilized 1 hour at 105° C. 2.2 parts of ammonium sulfate and 5 parts of superphosphate are added to each 1000 parts of molasses. The sterilized nutrient molasses is added to water in the fermenter until the sugar concentration is 1.5%. The temperature is maintained at 30° C. A 1.5% inoculum of *Torula utilis* is added and aeration commenced. The sterile 50° Brix nutrient molasses solution is added so as to maintain a sugar concentration of 1-2%. The resultant spent yeast wort is pasteurized at 80° for 2 hours and is used to supply nutrient to the Leuconostoc fermentation medium.

Twenty parts of the pasteurized yeast wort is added to 980 parts of cane juice which contains 120 parts of sucrose. The pH is adjusted to 6.5 and the medium is sterilized at 125° C. for 20 minutes. After cooling to 25° C., 20 parts of an active 12 hour inoculum of *L. mesenteroides* is added. Within about 26 hours maximum viscosity is obtained and the medium is analyzed. Analysis has shown that such a medium contained 56 parts of dextran and 60 parts of reducing sugar calculated as fructose.

The dextran can be recovered at the end of the fermentation by the generally accepted procedure, namely, by dehydrating and rendering the colloid suspension of dextran unstable by adding a water miscible volatile organic solvent to the culture liquor. Methyl, ethyl or isopropyl alcohol, acetone, and methyl ethyl ketone are generally satisfactory. The solvent concentration is about 50 to 70% and the precipitated product is purified by several reprecipitations with solvent from water.

Thus when the maximum dextran yield has been obtained by the dextran fermentation the dextran may be recovered from the fermented medium by adding a water-soluble organic solvent, such as acetone, methanol, ethanol, isopropanol, or methyl ethyl ketone, until the solvent concentration is around 50 to 70% so as to precipitate the dextran as an amorphous, sticky mass which is obtained by decantation. The product may be purified to the desired extent by reprecipitation from a 5 to 20% aqueous suspension and finally dried by spray drying or roll drying of a heavy aqueous suspension. The solvent is recovered for reuse. The fructose may be recovered from the spent liquors if desired by precipitation with lime and subsequent carbonation to remove the calcium as calcium carbonate.

An advantageous method of separating the dextran from the fermentation liquor is by precipitation of the dextran, by adding the appropriate amount of alkaline earth hydroxides and particularly calcium hydroxide to produce complete precipitation of dextran as a complex compound, namely as alkaline earth dextranate complexes, as more fully described in the companion application Serial No. 201,497, now Patent No. 2,686,777. When calcium hydroxide is used the byproduct fructose is coprecipitated as the calcium hydroxide-fructose complex and the mixed precipitate can be further treated to separate the dextran and fructose, as described in said companion application.

We claim:

1. The improvement in the production of dextran from sucrose by Leuconostoc fermentation which comprises carrying out the fermentation in a culture medium made of pasteurized, freshly prepared yeast bear to which sucrose and the Leuconostoc culture are added.

2. The improvement in the production of dextran from sucrose by Leuconostoc fermentation which comprises carrying out the fermentation in a culture medium made of pasteurized, freshly prepared whole yeast beer to which sucrose and the Leuconostoc culture are added.

3. The improvement in the production of dextran from sucrose by Leuconostoc fermentation which comprises carrying out the fermentation in a culture medium made of fermented dilute sugar bearing yeast beer which has been pasteurized while containing the yeast cells to which the sucrose and the Leuconostoc culture are added.

4. The improvement in the production of dextran of claim 6 in which the yeast beer after pasteurizing is free from the yeast cells.

References Cited in the file of this patent

UNITED STATES PATENTS

| | | |
|---|---|---|
| 648,468 | Ruckforth | May 1, 1900 |
| 2,202,785 | Stiles et al. | May 28, 1940 |
| 2,203,703 | Stahly | June 11, 1940 |
| 2,223,501 | Torrington | Dec. 3, 1940 |
| 2,310,263 | Stahly | Feb. 9, 1943 |
| 2,392,258 | Owen et al. | Jan. 1, 1946 |
| 2,483,855 | Stiles | Oct. 4, 1949 |

OTHER REFERENCES

Stacey: Nature, 149, 1942, page 639.

Evans et al.: Bacterial Polysaccharides, adv. in Carbohydrate Chemistry, vol. II, 1947, Academic Press, page 211.